April 28, 1942.  H. H. ROBY  2,281,456
VARIABLE PITCH PROPELLER
Filed Oct. 19, 1940  2 Sheets-Sheet 1

INVENTOR
Horace H. Roby
BY Thos. E. Scofield
ATTORNEY

April 28, 1942.    H. H. ROBY    2,281,456
VARIABLE PITCH PROPELLER
Filed Oct. 19, 1940    2 Sheets-Sheet 2

INVENTOR
Horace H. Roby
BY
ATTORNEY

Patented Apr. 28, 1942

2,281,456

UNITED STATES PATENT OFFICE 2,281,456

VARIABLE PITCH PROPELLER

Horace H. Roby, Wichita, Kans., assignor to Roby, Inc., a corporation of Kansas

Application October 19, 1940, Serial No. 361,884

12 Claims. (Cl. 170—163)

My invention relates to variable pitch propellers and more particularly to propellers for aircraft in which the pitch of the propelling blades may be changed at will during the operation of the propeller.

This application is a continuation in part of my co-pending application, Serial No. 354,560, filed August 28, 1940.

Variable or controllable pitch propellers for aircraft and the like have been proposed many times heretofore and certain of the arrangements, particularly those operated by fluid pressure, have been successful. No simple, mechanically operated, variable pitch propeller, capable of adjustment during flight, has been produced heretofore, to my knowledge.

It is peculiarly desirable, especially in light airplanes and observation, interceptor, scouting and fighter planes that the takeoff time from the landing field be reduced to a minimum. With a fixed pitch propeller blade, the angle of attack of the propeller must necessarily be a compromise with the result that it operates most efficiently only under certain predetermined conditions of air density, engine speed and plane speed. For example, it is desirable that a propeller should be adjusted to a low pitch during the takeoff period. At this time, the airplane accelerates from zero velocity to flying speed and is moving through the air as slowly as it ever does. Under these conditions, the resistance offered by the air to rotation of the propeller holds the engine to comparatively low speed. Internal combustion engines do not develop maximum power at low speeds and therefore, during the takeoff period, the engine is least efficient when the highest power should be available. If, during the takeoff period, a low pitch is given the propeller blades, the engine can attain its efficient speeds immediately, enabling a quick, short takeoff and rapid elevation to be achieved.

When the plane assumes its normal flight and the velocity of the plane through the air is somewhat near its designed velocity, the resistance to propeller rotation is decreased so that the engine will tend to run faster than desired with a low pitch blade. At this point, it is desirable to increase the pitch of the blades so that the engine may be throttled down to its designed speed.

It will be seen that the variable pitch propeller, therefore, serves a function analogous to a gear shift in an automobile. It enables an internal combustion engine to run at its economical speeds irrespective of the load.

Since the airplane propeller is rotating and the adjusting mechanism must be stationary, at some point in the mechanism, it is necessary to transmit the force which accomplishes the adjustment through a rotating member. The forces acting on the airplane propeller are such that each propeller blade will tend to twist to lessen its pitch. The pitch of the blade determines what component of the force rotating the propeller is made to serve in pulling or pushing an airplane through the air. The greater the pitch the greater the component moving the air in a direction longitudinally of the plane. In a variable pitch propeller, furthermore, there is a thrust tending to force the plane in the direction of its flight. This thrust is normally taken by the crank shaft thrust bearings and offers no particular problem in a variable pitch propeller. The torque, however, tending to turn the blades to the point of zero pitch, is critical in a variable pitch propeller. This torque must be borne by a bearing interposed somewhere in the system between the adjusting mechanism in the cockpit of an airplane and the blade itself if we are to have a mechanism capable of being adjusted in flight.

One object of my invention is to provide a simple, sturdy, dependable and light, variable pitch propeller by which the pitch of a propeller may be changed at will during rotation of the propeller.

Another object of my invention is to provide a variable pitch propeller for mechanically changing the pitch of a propeller during rotation, in which the torque tending to rotate the blades to zero pitch is divided, so that only a portion of this thrust will be borne by the critical variable pitch propeller bearing.

Other and further objects of my invention will appear from the following description.

In the accompanying drawings which form part of the instant specification and are to be read in conjunction therewith and in which like reference numerals are used to indicate like parts in the various views.

Figure 4:
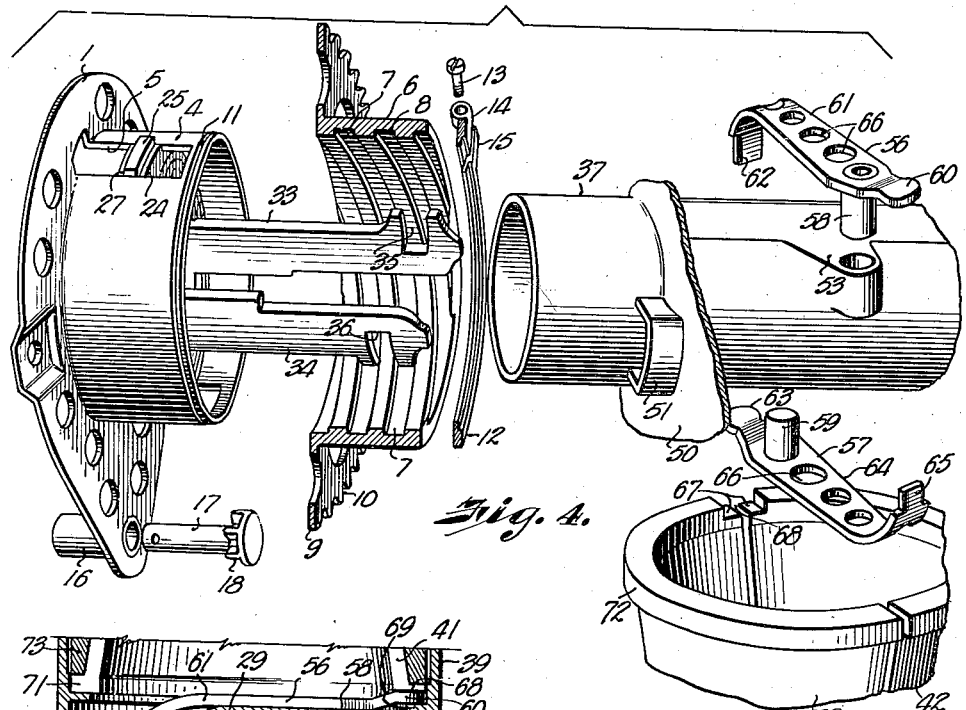
Figure 4 is an exploded perspective view with parts in section, of my variable pitch propeller assembly.
Figure 2:
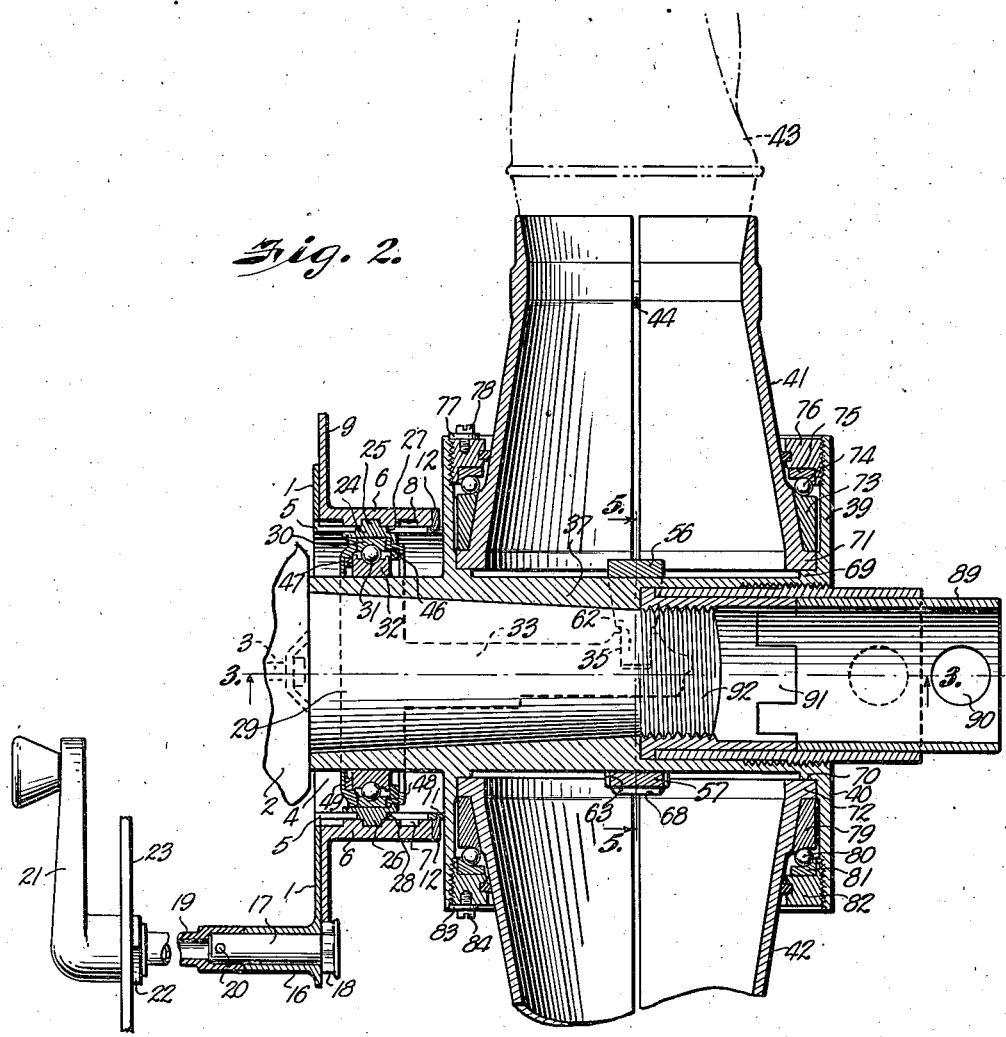
Figure 2 is a sectional view taken on the line 2—2 of Figure 1.
Figure 3:
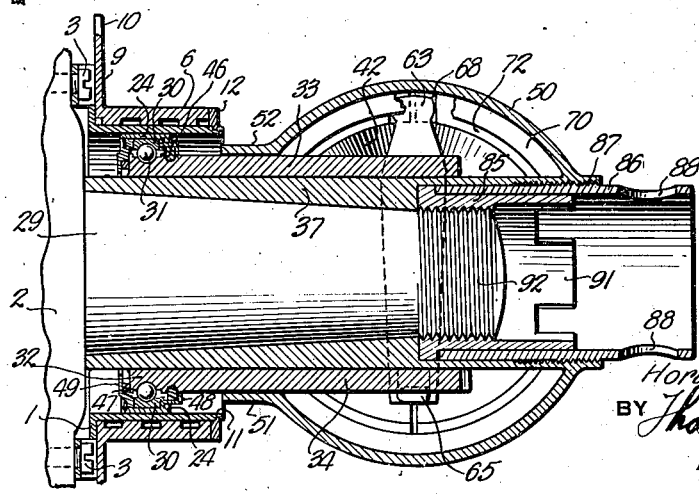
Figure 3 is a sectional view taken on the line 3—3 of Figure 2.

Referring now to the drawings, a base member 1 is secured to any suitable portion of the airplane, as for example, the crank case 2 by means of stud bolts 3, as can readily be seen by reference to Figures 2 and 3. The base member 1 is formed with a cylindrical portion 4 and slots 5. A cam member 6, provided with cam slots 7 and 8, is adapted to fit over the cylindrical portion 4 of the member 1. The cam member 6 is provided with a flange 9 formed with gear teeth 10. A groove 11 is formed adjacent the outer periphery of the cylindrical portion 4 and adapted to receive a locking ring 12. The locking ring 12, as can be seen from Figure 4, is a split ring adapted to be clamped into the groove 11 by means of a locking screw 13, acting through lugs 14 and 15 of the collar 12. A sleeve 16 is supported by the member 1 and houses a stub shaft 17 to which a pinion 18 is secured. The pinion 18 is adapted to mesh with the gear teeth 10 on the cam flange 9. A shaft 19 is secured to the stub shaft 17 by means of a pin 20. A crank 21 is adapted to be rotated in a suitable bearing 22, secured to a portion 23 of the airplane to rotate the stub shaft 17. The shaft 19, it is to be understood, may be a flexible shaft or the like. A follower ring 24 is provided with lugs 25 and 26 which engage the cam slots within the cam 6, as can readily be seen by reference to Figure 2. Bosses 27 and 28 are formed on the follower ring and are adapted to engage the sides of slots 5 formed in the cylindrical portion 4 of the member 1. It will be seen that the bosses acting through slots 5, prevent the follower ring from rotating. Rotation of the cam member 6 will move the follower ring axially of the crank shaft 29 of the engine. The follower ring 24 carries a thrust bearing race ring 30. Suitable ball bearings 31 support a thrust ring 32. The thrust ring 32 is formed integrally with a pair of arms 33 and 34.

It will be seen that the bearing comprises a follower ring 24 which holds a race ring 30, the ball bearings 31 and the follower ring 32. The thrust bearing is sealed by sealing gaskets 46 and 47, held in place by sealing rings 48 and 49 respectively, as can readily be seen by reference to Figures 2 and 3. The arrangement is such that the ball race of the thrust bearing may be periodically packed with lubricant which is sealed and retained by the sealing rings and sealing gaskets. Due to the fact that, by means of my invention, I relieve this vital thrust bearing of a large percentage of the thrust transmitted by the torque on the blades, the load on the bearing is thus lessened to a point where it will run without developing heat, for long periods of time.

Arm 33 is provided with an upwardly directed fork 35 while arm 34 is provided with a downwardly directed fork 36.

Figure 1:
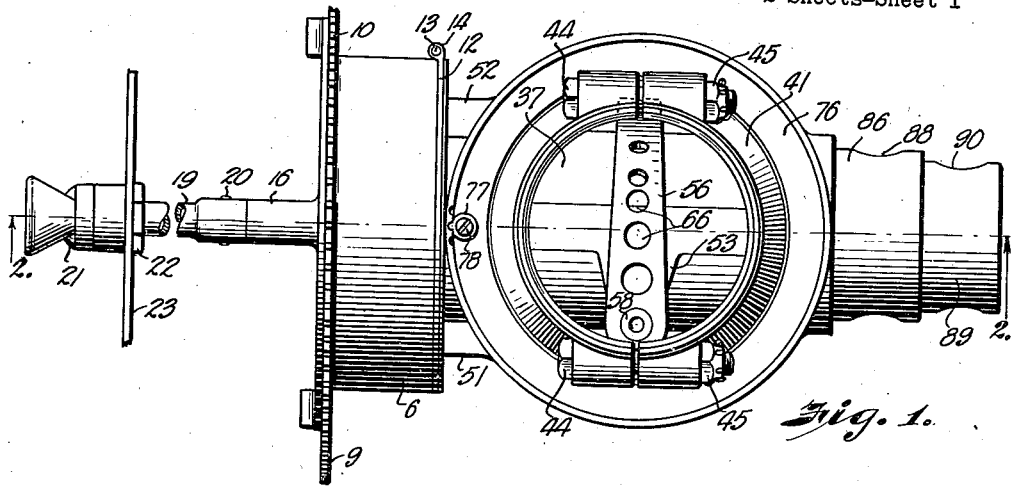
Figure 1 is a plan vew of a variable pitch propeller assembly showing one embodiment of my invention.
Figure 5:
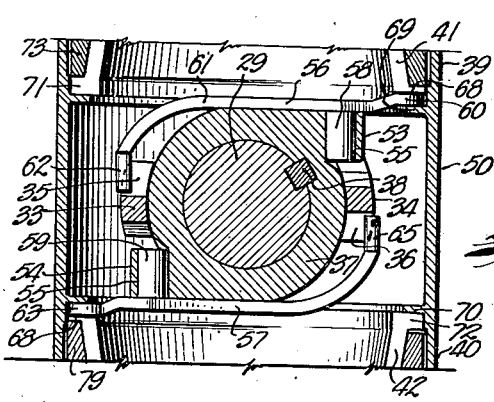
Figure 5 is a sectional view taken on the line 5—5 of Figure 2.

My propeller hub comprises a hub portion 37 adapted to be secured to the crank shaft 29 by means of a key 38, as can readily be seen by reference to Figures 2, 3, and 5, and a plurality of blade sockets 39 and 40. While I have shown a two-bladed propeller, it is understood, of course, that my invention is applicable to a three-bladed propeller, as well. The number of blade sockets 39 and 40 will depend on the number of blades of the particular propeller. The blade socket 39 is adapted to receive a blade-holding, clamping member 41, while the blade socket 40 is adapted to receive a blade-holding, clamping member 42. The blade clamping members are formed with two parts and are adapted to embrace the end of the propeller blade 43. The two portions of the members 41 and 42 are held together by bolts 44 and nuts 45, as can readily be seen by reference to Figure 1. The arrangement is such that the diameter of the propeller from blade tip to blade tip with the blades in my variable pitch hub, will be exactly the same as that for the hub for which the blades were originally designed. My arrangement is so compact that this may be readily achieved and yet all moving members be encased, which it will be readily appreciated, presents a distinct advantage.

The two socket portions 39 and 40 are joined by an intermediate cylindrical portion 50, as can readily be seen by reference to Figure 5. Hollow projections 51 and 52 are formed in cylindrical portion 50, as can readily be seen by reference to Figures 1, 3, and 4. These projections provide communication between the exterior and interior of the cylindrical portion 51 and permit the passage of the arms 34 and 33 into the interior of the cylindrical portion 50 around the outside of the hub 37. The hub 37 is formed with ears 53 and 54, as can readily be seen by reference to Figures 4 and 5. These ears are provided with sockets 55. Levers 56 and 57 are formed with pins 58 and 59 adapted to pivotally seat in the respective sockets 55 on ears 53 and 54, as can be seen by reference to Figure 5. It will be seen that lever 56 is provided with a short arm 60 and a long arm 61. The long arm 61 is bent downwardly to form a projection 62. Lever 57 likewise is provided with a short arm 63 and a long arm 64 which is bent upwardly to form a projection 65. Each of the levers is fitted with lightening holes 66.

Propeller clamping members 41 and 42 are formed with notched portions 67 which, when assembled, form recesses 68 adapted to receive the short ends 60 and 63 respectively of the levers 56 and 57. The clamping members 41 and 42 are adapted to seat in sockets 39 and 40 respectively upon shoulders 69 and 70, formed within the sockets 39 and 40. The lower ends of the propeller clamping members 41 and 42 are formed with flanges 71 and 72 which seat upon shoulders 69 and 70. The flange 71 receives a race ring 73 upon which ball bearings 74 are adapted to seat. A thrust ring 75 seats upon the ball bearings 74 and is secured in place by a securing ring 76. The securing ring 76 is adapted to be threaded into the socket 39 and is locked in place by a locking washer 77 and locking stud 78. Similarly, the flange 72 is adapted to receive a race ring 79 upon which ball bearings 80 seat. A thrust ring 81 is secured in place by a securing ring 82 which is, in turn, locked in place by a locking washer 83 and a stud screw 84.

It will be seen that propeller clamping members 41 and 42 are free to turn upon the ball bearings 74 and 80 respectively and that the thrust generated by centrifugal force is taken by the thrust rings 75 and 81 and transmitted to the securing rings 76 and 82 and thence to the socket portions 39 and 40 respectively.

The projection 62 of the lever 56 is adapted to seat in the fork 35 formed in the arm 33. The projection 65 of the lever 57 is adapted to seat in the fork 36 of the arm 34.

It will be observed that the arms 33 and 34 are integral with the rotatable thrust element 32 and that they are positioned closely adjacent the hub 37 so that the arms 33 and 34, besides transmitting adjusting movement to the levers 56 and 57, act as a guide preventing the thrust bearing assembly from canting. This can best be seen by reference to Figure 3. In this manner, I assure that the arms 33 and 34 will always be of the same effective length, irrespective of any lost motion in the cam between the cam and the followers or between the stationary thrust element and the rotating thrust element. It will be readily appreciated that if the thrust bearing becomes canted and one of the arms 33 or 34 is thus effectively longer or shorter than the other of the arms, then one of the propeller blades will be adjusted to greater or lesser pitch than the other. This will introduce an unbalancing of thrust on one blade over the other, making for vibration.

With my arrangement, the arms 33 and 34 being integral with the rotatable thrust element 32, I eliminate one pivot point which would be necessary if links were used. Due to the fact that the projections 62 and 65 of the links 56 and 57, which engage the forks 35 and 36 of the arms 33 and 34, have curved contact surfaces, a continuous contact is made so that there is no lost motion between the propeller blades and the cam 6. The absence of lost motion and the rigidity imparted to the assembly by the rigid arms 33 and 34 resting upon the exterior of the hub portion 37, which arms are integral with the rotating thrust element 32, enable me to accomplish the rigidity desired in a variable pitch propeller and minimize danger of vibration due to unequal adjustment of one propeller blade over the other. My construction thus presents a distinct advance in the art over those attempts to construct variable pitch propellers which have used linkages.

The assembly is secured to the crank shaft 29 by means of a castellated nut 85. The castellated nut 85 is locked in position by a tubular locking member 86 which is provided with screw threads 87 engaging a correspondingly threaded portion formed in the interior of the propeller hub. The tubular locking member 86 is formed with holes 88 through which a rod or any other suitable operating member may be passed. A tubular wrench 89 fitted with holes 90 is shown in Figure 2, engaging the castellations 91 of the nut 85.

In securing my assembly of a crank shaft, the castellated nut 85 is set tight by means of the wrench 89. The locking member 86 is then set in place through its screw threads 87 and the assembly is thus locked in place. The castellated nut 85 engages screw threads 92 formed on the end of the crank shaft 29. The threads 92 are of coarser pitch than the threads 87; that is to say, the locking sleeve 86 has its screw threads formed finer than the threads 92 with which the castellated nut acts.

When removing the assembly from the crank shaft, the locking sleeve 86 may be backed off a short distance. The tubular wrench 89 may then be used to back off the castellated nut 85, moving it some distance along its threads 92. The locking sleeve 86 may then be rotated toward locking position, loosening the assembly from the crank shaft.

In operation, just before the airplane takes off, the crank 21 is operated to rotate the cam to move the cam follower ring 24 forwardly. The cam follower ring, through the propeller thrust bearing, will move the thrust ring 32 forwardly. Since the arms 33 and 34 are secured to the ring 32, they, in turn, will move forwardly. Fork 35, being in engagement with projection 62, will rotate the lever 56 in a clockwise direction. The short arm 60 of this lever being seated in the recess 68 of the upper propeller clamping members 41, will rotate the upper propeller blade to reduce the pitch, it being assumed that the propeller is driven by a motor which runs in a clockwise direction viewed from the cockpit of the plane. Similarly, the fork 36, being in engagement with the projection 65, will rotate the lower lever 57 in a counterclockwise direction. The short arm 63 of the lower lever 57 being seated in recess 68 will rotate the lower propeller clamping members 42 in a counterclockwise direction, decreasing the pitch of the other blade of the propeller in like amount but opposite direction from the first blade. The decrease in propeller pitch will permit the engine to run at its economical normal speed. After the takeoff has been achieved and the plane has resumed its normal level flight, the crank 41 is operated in the opposite direction to rotate the cam 6 to move the follower ring 24 toward the cockpit of the plane, it being assumed that we have a tractor plane, thus retracting the thrust ring 32 and the arms 33 and 34 toward the cockpit or in the opposite direction from which they were first moved. This movement will rotate the lever 56 in a counterclockwise direction around its pivot 58 and the lever 57 in a clockwise direction around the pivot 59, thus increasing the pitch of the blades held by the propeller blade clamping members 41 and 42 respectively.

It will be observed that the torque on the blades tending to twist them to zero pitch is transmitted through the propeller clamping members which are rotatably mounted in the sockets. Since the notched portions 68 which receive the short ends of the lever arms are adjacent the outer peripheries of the propeller blade clamping members, we have the effect of a lever arm whose length is the radius from the center of the propeller blade clamping members to their flanges. The torque, however, is not transmitted directly to the stationary thrust bearing race 30. It is transmitted through the levers 56 and 57. Let us assume, for example, that the short arms 60 and 63 of the levers 56 and 57 were one-fourth the length of the long arms 61 and 64. In this case, the thrust transmitted by each of the levers to the propeller thrust bearing would be only 25 per cent of that exercised at the periphery of the propeller blade receiving members (neglecting friction). The other 75 per cent of the thrust would be absorbed by the lugs 53 which are formed on the propeller hub 37. This propeller hub is secured to the crank shaft and hence the major proportion of the torque thrust of the individual propeller blades is removed from the propeller thrust bearing which has been the critical point in mechanical variable pitch propeller arrangements due to the necessity of transmitting motion from a stationary to rapidly moving parts.

It will be seen that I have accomplished the objects of my invention. I have provided a simple, mechanically operated variable pitch propeller which is light in weight and capable of controlling the pitch of propeller blades such as airplane propeller blades, during operation. The arrangement is such that the major proportion of the individual blade torque is carried by a rotating portion of the hub and transmitted directly to the crank shaft thrust bearing. Only a minor proportion of the thrust resulting from the individual blade torque is transmitted to the movable thrust bearing through which the control is effected. Due to the fact that the load on the thrust bearing is thus lessened, the difficulties encountered in the prior art are avoided and the problem of lubricating the propeller thrust bearing is greatly simplified due to its lessened load.

I have equipped a standard light airplane with a variable pitch propeller of my invention. This airplane, before fitting it with my variable pitch propeller, took eleven minutes to gain an altitude of 3,000 feet at maximum throttle. The same airplane, equipped with my invention and using the same propeller blades achieved an altitude of 3,000 feet in six minutes. Furthermore, the ship left the ground after traveling only one-half the distance which it traveled with its normal, non-variable pitch propeller. The motor of the light plane on which this demonstration was made generated fifty horsepower at full power. During the takeoff with the conventional propeller, the motor achieved only forty-three horsepower. With my variable pitch propeller, the motor was able to achieve its rated fifty horsepower during the takeoff period. Furthermore, the additional weight over a standard hub is but a few pounds. It will be further noted that, besides being light in weight, all rotating parts affected by centrifugal force are placed closely adjacent the center line of the crank shaft, thus lessening the effect of centrifugal force on them.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A controllable pitch propeller including in combination a hub structure, blades rotatably mounted on the hub, a propeller shaft, a hub sleeve fixed to the shaft, levers pivoted on said sleeve within the projected perimeters of the blades, each of said levers having a short arm and a long arm, means engaging the short arms for rotating said blades, a thrust bearing having a rotating element and a non-rotating element, means connecting the long arms of said levers and said rotating thrust element, and means for moving said non-rotating thrust element to adjust said levers to control the pitch of the propeller blades.

2. A controllable pitch propeller for aircraft including in combination a hub, propeller blades journaled on said hub for pitch-adjusting rotation about their individual axes, levers pivoted intermediate their ends on said hub, each of said levers having a short arm and a long arm, means connecting said short arms and said blades for rotating the same about their axes to adjust the propeller blade pitch, a thrust bearing having a rotating element and a non-rotating element, means connecting said rotating element and said long lever arms, a cam follower secured to said non-rotating thrust element, a rotatable cam, and means for rotating said cam to move said non-rotating thrust element axially of the hub to control the pitch of said blades.

3. A controllable pitch propeller for aircraft, including in combination a hub, propeller blades journaled on the hub for pitch adjusting rotation about their individual axes, levers pivoted intermediate their ends on said hub, each of said levers having a short arm and a long arm, means connecting said short arms to said propeller blades for rotating the same to adjust their pitch, a thrust bearing having a rotatable element and a non-rotatable element, means connecting said rotatable element to said long lever arms, said non-rotatable element being formed with cam followers, supporting means secured to a portion of the aircraft, a cam rotatably mounted on said supporting means, said cam being formed with cam slots engaging said followers, means for preventing the rotation of said non-rotatable thrust element while permitting axial movement thereof, means for preventing axial movement of said cam while permitting rotation thereof, and means for rotating said cam to impart an axial movement to said thrust bearing to pivot said levers to adjust the pitch of said propeller blades.

4. A controllable pitch propeller as in claim 3 in which said means for rotating said cam comprises a cam flange, gear teeth formed on said flange, a shaft journaled in said supporting means, a pinion secured to said shaft and engaging said flange teeth, and means operable from the cockpit of the aircraft during flight for rotating said pinion shaft.

5. A controllable pitch propeller as in claim 3 in which said cam supporting means is formed with slots extending axially of the cam and said followers project through said slots.

6. A controllable pitch propeller as in claim 3 in which said means connecting the short arms to the propeller blades comprise respective propeller clamping members adapted to embrace respective propeller blades, said clamping members being formed with respective reentrant portions adjacent their peripheries, said short arms being seated in the reentrant portions and adapted upon the pivoting of said levers to rotate said propeller clamping members.

7. A controllable pitch propeller as in claim 3 in which the journals for pitch adjusting said propeller blades on said hub comprise hub socket portions being formed with seats, propeller blade clamping members adapted to embrace respective propeller blades, said propeller blade clamping members having flanges seated in said sockets on said seats, thrust bearings in said sockets outboard of said flanges, and means for retaining said thrust bearings in said sockets.

8. A controllable pitch propeller as in claim 2 in which said hub is provided with means for securing the same to the crank shaft of an aircraft engine, said crank shaft being formed with a threaded end, a nut adapted to engage a portion of the hub threadedly secured upon said crank shaft threads, and a locking member threaded in said hub having a portion adapted to engage said nut.

9. A controllable pitch propeller as in claim 2 in which said means connecting said rotating element and said long lever arms include arms formed integral with said rotating element of said thrust bearing.

10. A controllable pitch propeller as in claim 2 in which said means connecting said rotating element and said long lever arms include arms formed integral with said rotating element of said thrust bearing, said arms being positioned in contact with a portion of said hub.

11. A controllable pitch propeller including in combination a hub structure, blades rotatably mounted on the hub, a propeller shaft assembly comprising pivot supports, levers pivoted on said supports within the projected perimeters of the blade roots, each of said levers having a short arm and a long arm, means engaging the short arms for rotating said blades, a thrust bearing having a rotating element and a non-rotating element, means connecting the long arms of said levers and said rotating thrust element, and means for moving said non-rotating thrust element to adjust said levers to control the pitch of the propeller blades.

12. A controllable pitch propeller including in combination a hub structure including blade sockets, blades rotatably mounted on the hub within said sockets, a propeller shaft assembly comprising pivoted supports, levers entirely within said sockets and pivoted on said supports, each of said levers having a short arm and a long arm, means engaging the short arms for rotating said blades, a thrust bearing having a rotating element and a non-rotating element, means connecting the long arms of said levers and said thrust element, and manually operated means for moving said non-rotating thrust element to adjust said levers to control the pitch of the propeller blades.

HORACE H. ROBY.